Feb. 16, 1943.                H. T. SEELEY                2,311,474
                            CONTROL APPARATUS
                        Filed Dec. 24, 1941            2 Sheets-Sheet 1
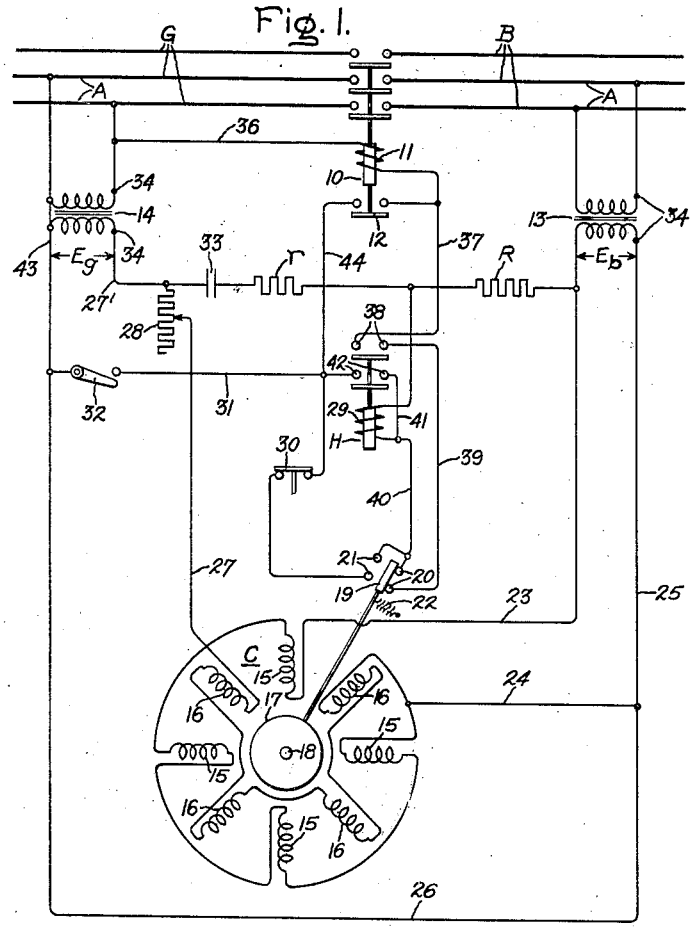
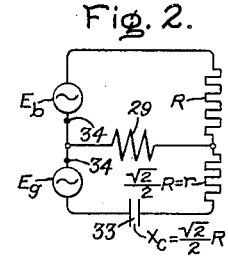
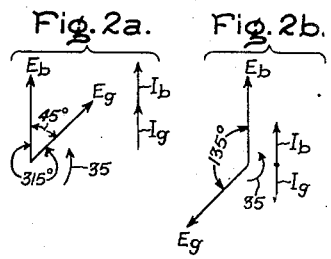
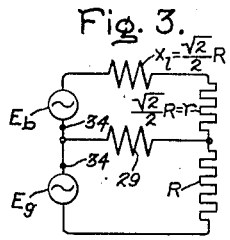
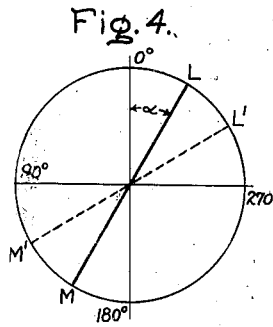
Characteristic of C
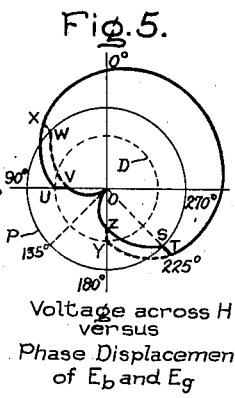
Voltage across H
versus
Phase Displacement
of $E_b$ and $E_g$
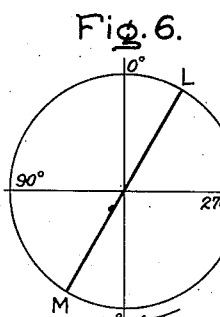
Source G slow
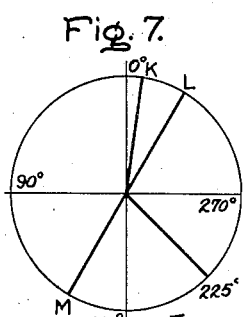
Source G fast
Inventor:
Harold T. Seeley,
by Harry E. Dunham
His Attorney.

Feb. 16, 1943.  H. T. SEELEY  2,311,474
CONTROL APPARATUS
Filed Dec. 24, 1941  2 Sheets-Sheet 2
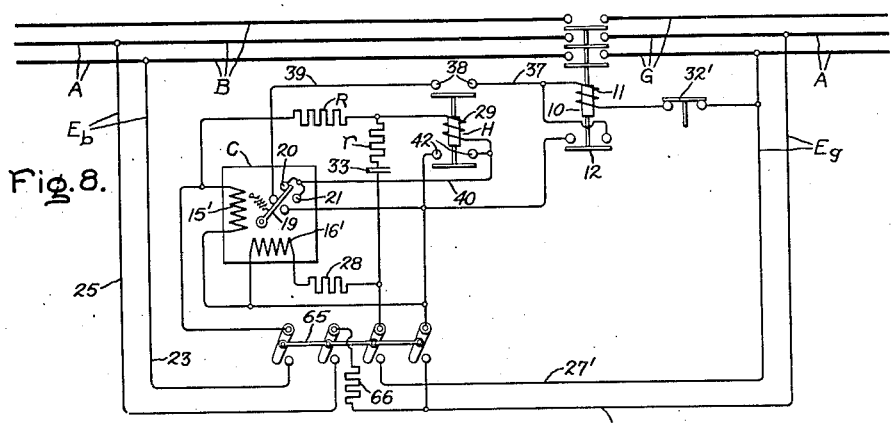
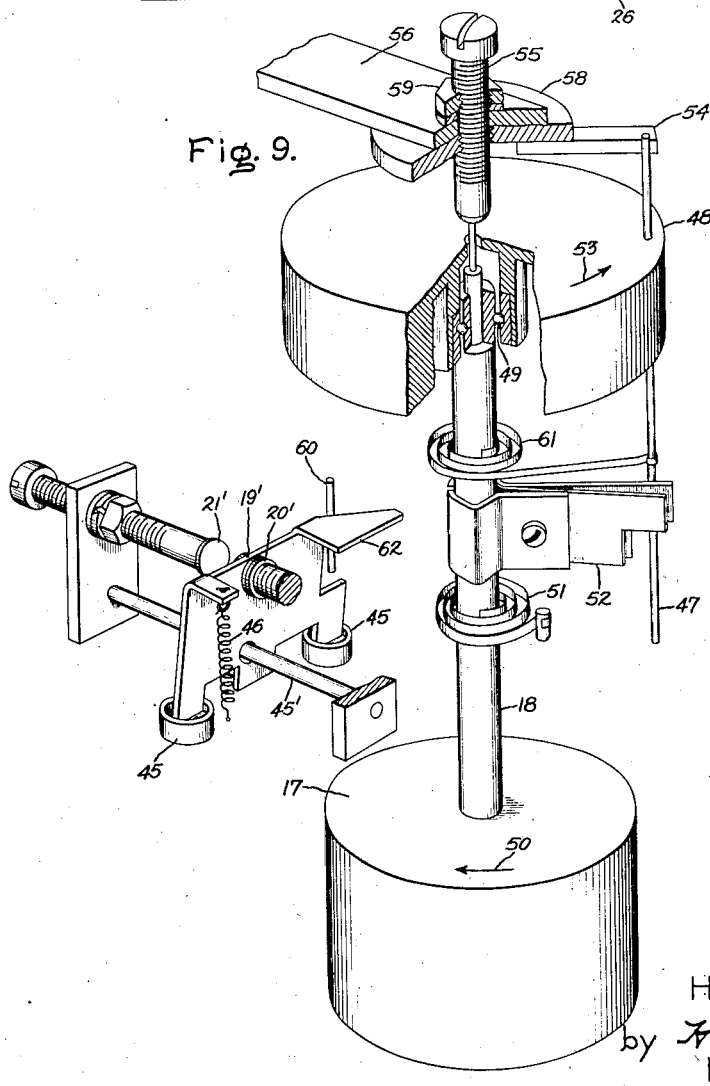
Inventor:
Harold T. Seeley,
by Harry E. Dunham
His Attorney.

Patented Feb. 16, 1943

2,311,474

UNITED STATES PATENT OFFICE 2,311,474

CONTROL APPARATUS

Harold T. Seeley, Lansdowne, Pa., assignor to General Electric Company, a corporation of New York Application December 24, 1941, Serial No. 424,323

18 Claims. (Cl. 171—118)

My invention relates to improvements in control apparatus for determining when two sources of alternating electromotive force may be safely interconnected and for effecting an interconnection without hazard to the dynamo-electric machines involved.

It is, in general, desirable to complete a connection between two sources of alternating electromotive force only when corresponding electromotive forces of the sources are substantially alike in frequency, phase, and value. In order to eliminate the fallibility of the human element, it is desirable to have the connecting operation done automatically. The approach to precision of such an operation is a matter of economics and requires, particularly in alternating current generators of relatively large capacity, an arrangement for close adjustment of the generator speed. However, there are many relatively small capacity, internal combustion engine-driven alternating current generators which, as a matter of economy, are not provided with such speed adjustment. Also, they are not, in general, provided with any automatic connecting means since the refinements necessary in automatic connecting equipment for large capacity dynamo-electric machines render the cost prohibitive for the smaller capacity machines. Such refinements, however, are not necessary with the smaller capacity machine since the kinetic energy of the rotating mass is relatively small. Moreover, an incoming machine can more readily be connected to a running machine since in such small capacity engine-driven generators the governors are purposely designed to have a lower speed at full load than at no load and in the absence of adjustment of this speed the incoming machine will necessarily be running at least as fast as the running machine or faster if the running machine is carrying any load. Also, such engine-driven sets accelerate so rapidly that they are running above synchronous speed before the generator voltage builds up to normal value. In the absence of speed control, there is thus no opportunity which might otherwise be available for synchronizing while the machine is running below synchronous speed but approaching synchronous speed. Incidentally, with commercially available relays, synchronizing in only one direction of frequency difference is more simply and economically accomplished than trying to synchronize in both directions. Moreover, since economy is largely the controlling factor, it is necessary that any automatic connecting means embody the minimum of auxiliary devices, such as potential transformers and the like. To this end, it is desirable that any automatic connecting means be arranged to operate on the basis of not more than two electromotive forces, one obtained from the incoming machine and the other from the running machine or the bus to which the incoming machine is to be connected.

An object of my invention is to provide an improved arrangement, for determining when two sources of alternating electromotive force may be safely connected, which requires the minimum of auxiliary devices and particularly potential transformers and the like. Another object of my invention is to provide an improved arrangement, for automatically connecting two sources of alternating electromotive force, which permits a connecting operation only when the frequency of the incoming source exceeds the frequency of the running source. Still another object of my invention is to provide an improved automatic connecting arrangement whose operation is not materially affected by variations and inequalities of the magnitudes of the electromotive forces used for comparison. A further object of my invention is to provide an automatic connecting arrangement which is relatively simple and economical and which can be used without any remote speed-control of the incoming machine. A still further object of my invention is to provide, when necessary, a refinement for preventing a connecting operation when the frequency difference is too great for a safe connection. These and other objects of my invention will appear in more detail hereinafter.

In accordance with my invention, I provide an arrangement for determining when two sources of alternating electromotive force may be safely connected, on the basis of a comparison of only two electromotive forces respectively derived from two corresponding electromotive forces of the sources. Further, in accordance with my invention, I provide an automatic connecting arrangement such that the connecting operation can be effected only when the frequency of the incoming source is greater than the frequency of the running source. Also, in accordance with my invention, I provide an automatic connecting arrangement embodying two electrically interlocked cooperating electromagnetic devices, which are responsive to the phase relation between two corresponding electromotive forces of the sources and can function to start a connecting operation prior to the in-phase condition only when the frequency of the incoming source is greater than the frequency of the running source. Likewise, in accordance with my invention, the correct functioning is practically independent of variations in and inequalities of the electromotive forces used for comparison, and the functioning of the other cooperating device is not materially affected by such variations and inequalities. Also, in accordance with my invention, I incorporate in one of the electromagnetic devices, when necessary, a refinement for preventing a connecting operation in those cases where the frequency difference may vary so rapidly as to cause an unsafe operation without such refinement.

My invention will be better understood from the following description when considered in connection with the accompanying two sheets of drawings, and its scope will be pointed out in the appended claims.

In the accompanying drawings, Fig. 1 illustrates diagrammatically an embodiment of my invention for automatically connecting two sources of alternating electromotive force under predetermined conditions; Fig. 2 is a schematic diagram illustrating a part of the circuit arrangements shown in Fig. 1; Figs. 2a and 2b are vector diagrams explanatory of the embodiment of my invention shown in Figs. 1 and 2; Fig. 3 is a schematic circuit diagram similar to Fig. 2 and illustrating a slight modification of the embodiment of my invention shown in Fig. 1; Figs. 4 to 7 inclusive, are polar diagrams explanatory of my invention; Fig. 8 illustrates diagrammatically a modification of the embodiment of my invention shown in Fig. 1; and Fig. 9 illustrates in perspective a portion of an electromagnetic device modified in accordance with my invention to provide a frequency response refinement in the connecting operation.

In the embodiment of my invention shown in Fig. 1, two sources of polyphase alternating electromotive forces are schematically illustrated by circuit conductors B and G respectively. As far as my invention is concerned, it is immaterial whether these sources are single phase or polyphase. The sources B and G will also be referred to respectively as the bus and the generator as well as the running machine and the incoming machine since it is assumed that some source of alternating electromotive force is operated to energize the bus B. For connecting the generator or incoming machine G to the bus or running machine B, suitable connecting means schematically illustrated in Fig. 1 as a contactor 10 may be used although as far as my invention is concerned, any other suitable means, such as a circuit breaker, examples of which are well-known to the art, may be employed. As shown, the contactor 10 comprises an energizing winding 11 and an $a$ auxiliary switch 12 which is closed when the contactor is closed and open when the contactor is open and whose functions will appear as the description of my invention progresses.

For controlling the closing operation of the contactor 10, I provide in accordance with my invention two cooperating electromagnetic means, such as relays C and H, which are so interlocked that while the generator frequency is below the bus frequency no closing control is completed, but as soon as the generator frequency exceeds the bus frequency, a closing control is completed at a predetermined angle of advance on the first passage in the reverse direction through a definite angular relation. The circuit connections and energizations of the relays C and H are such that the operation or response of each device is dependent on the phase relation of two corresponding electromotive forces of the sources B and G. In the illustrated embodiment of my invention, these corresponding electromotive forces are the voltages across phase A of the sources. For suitable isolation of the two sources when the contactor 10 is in the open circuit position and, also, in order to have voltages of a magnitude suitable for the equipment used, potential transformers 13 and 14, whose primary windings are connected across phase A of the sources B and G respectively, are provided.

According to my invention, the electromotive force or voltage phase relation responsive relay C is preferably of the type whose operating force or torque is dependent on the product of two electrical quantities, the voltages of phase A of the sources B and G, for example, and a function of the phase angle between the voltages and, more specifically, the sine of a function of this phase angle. Examples of such relays are known to the art, and the one I have chosen schematically to illustrate is of the so-called induction cup or cylinder type disclosed in U. S. Letters Patent Reissue 21,813, dated May 27, 1941 and assigned to the assignee of this invention. For simplicity in illustration, I have omitted the magnetic structure of the relay and shown only the operating coils 15 and 16, which are mounted on the inwardly projecting poles of a magnetic stator, not shown, the induction cylinder 17, which is mounted on a shaft 18 so as to rotate in air gaps between the inner ends of the polar projections and another stationary magnetic stator, not shown, within the cylinder. Arranged to be actuated in response to rotation of the cylinder 17 is a contact controlling member 19 which, as shown, is arranged to control two sets of contacts 20 and 21. This contact controlling member is biased for clockwise movement by suitable means, such as a relatively light spring 22.

The coils 15 are so wound and series connected in a single winding circuit including conductors 23, 24 and 25 that, when energized by an alternating electrical quantity, the voltage $E_b$ across the secondary winding of the bus potential transformer 13, as shown they present at any instant alternate poles of like polarity and adjacent poles of different polarity at the ends adjacent the cylinder 17. Similarly, the coils 16 are so wound and series connected in a single winding circuit including conductors 24, 26 and 27 that, when energized by an alternating electrical quantity, the voltage $E_g$ across the secondary winding of the generator potential transformer 14, as shown, they present at any instant alternate poles of like polarity and adjacent poles of different polarity at the ends adjacent the cylinder 17. The maximum torque angle of the relay C may be controlled by suitable means, such as an adjustable resistance 28. The torque on the cylinder 17 is proportional to $E_b E_g \sin(\phi - \theta)$, $E_b$ and $E_g$ being respectively the voltages across the secondaries of the transformers 13 and 14, $\phi$ the phase angle between these voltages, and $\theta$ the angle of minimum torque. This torque relation is particularly advantageous relatively to the critical phase relations of the voltages. At these critical phase relations, as will hereinafter appear, torque reversal occurs, that is, the electromagnetically produced torque passes through zero and as it increases in the counterclockwise direction overcomes the light spring 22 to open the contacts 20 and close the contacts 21 and the spring 22 overcomes the electromagnetically produced counterclockwise torque as it decreases and passes through zero in the opposite direction to become a clockwise torque, whereby to open the contacts 21 and close the contacts 20. In the neighborhood of these torque reversal points, variations and inequalities of the voltages $E_b$ and $E_g$ produce the minimum effect on the electrical torque. In other words, departure of these voltages from their normal values and lack of equality between these voltages does not materially shift the phase relation at which torque reversal occurs. Consequently, such variations and inequalities as may commonly occur do not adversely affect the safety of the indicated connecting operations.

In accordance with my invention, I connect the electromagnetic device or relay H so that its pickup response can occur only during a predetermined range of phase displacement of the electromotive forces $E_b$ and $E_g$. For this purpose, I connect the energizing winding means 29 of the relay H for energization in dependence on the vectorial sum of two currents respectively flowing in circuits of different power factor and dependent on the electromotive forces $E_b$ and $E_g$. As shown in Fig. 1, one of the circuits includes the secondary winding of the bus potential transformer 13 for bus voltage $E_b$, a resistance R, the winding means 29, the contacts 21 of the relay C, an auxiliary switch 30, a conductor 31, an on-and-off switch 32 and the conductors 26 and 25. The other circuit includes the secondary winding of the generator potential transformer 14 for the generator voltage $E_g$, a condenser 33, a resistance $r$, the winding means 29, the contacts 21 of the relay C, the auxiliary switch 30, the conductor 31, and the on-and-off switch 32. The solid dots 34 in Figs. 1 and 2 indicate like polarities of the potential transformers 13 and 14.

In the embodiment of my invention illustrated in Fig. 1, I have so proportioned the resistances R and $r$ and the capacitive reactance $x_c$ of the condenser 33 that the phase displacement between the current and the voltage in one of the circuits differs from the phase displacement between the current and the voltage in the other circuit by a fixed amount. In other words, except for a slight variance due to the change in inductance of the relay H as its armature changes in position, the phase displacement of the currents in the two different power factor circuits exceeds the phase displacement of the electromotive forces $E_b$ and $E_g$ by a predetermined fixed amount. Thus, I may make the ohmic resistance of $r$ equal to the ohms reactance $x_c$ of the condenser 33 and each equal to $$\frac{\sqrt{2}}{2}R$$

as indicated in the partial schematic circuit diagram of Fig. 2. Consequently the phase displacement of the currents $I_b$ and $I_g$ produced by the electromotive forces $E_b$ and $E_g$ respectively will always be displaced 45° more than the electromotive forces producing these currents, on the basis of a counter-clockwise direction of rotation as indicated by the arrows 35 in Figs. 2a and 2b. These figures respectively show the phase displacements 0° and 180° of the currents $I_b$ and $I_g$ for phase displacements 315° and 135° of the electromotive forces $E_b$ and $E_g$. The construction of vector diagrams for other phase relations of voltages and currents will be obvious. In the vector diagrams illustrated, the bus voltage $E_b$ is taken as the reference voltage, and counterclockwise rotation of the voltage vector $E_g$, as shown by the arrow 35, indicates that the generator frequency is greater than the bus frequency.

For starting the closing operation of the contactor 10 at a predetermined phase angle before the inphase condition when the generator frequency is greater than the bus frequency, I provide for the energizing winding 11 of the contactor a closing control circuit which is jointly controlled by the relays H and C. As shown, this control circuit is energized in accordance with the phase A voltage of the generator G and includes a conductor 36, the energizing winding 11, a conductor 37, switching means such as circuit-closing contacts 38 of the relay H, a conductor 39, switching means such as the contacts 20 of the relay C, conductors 40 and 41, switching means such as contacts 42 of the relay H, a conductor 31, the on-and-off switch 32, and a conductor 43. For maintaining the contactor 10 closed independently of the relay switching means 38, 20, and 42, they are arranged to be by-passed in any suitable manner dependent on the closing of the contactor, for example, by the auxiliary switch 12, which is connected in parallel with the series connected switching means 38, 20, and 42 by way of the conductor 44. Since the energization of the relay H is dependent on the closing of the contacts 21 of the relay C, and the energization of the winding 11 is dependent on the closing of the contacts 20 following the closing of the contacts 21, and there is an interval between the opening of the contacts 21 and the closing of the contacts 20, the contacts 42 of the relay H are connected in parallel with the contacts 21 through conductor 41 to provide a holding circuit for the relay H so as to maintain the movable element of this relay in the picked-up condition as long as the vectorial sum of the currents $I_b$ and $I_g$ is sufficient for the purpose.

The operation of the embodiment of my invention shown in Fig. 1 will be better understood from the polar diagrams shown in Figs. 4 to 7, inclusive. In all these diagrams, the 0° position is the inphase position, and the voltage $E_b$ is assumed to be stationary in this position and of the magnitude or effective value shown by the radii of the circles in Figs. 4, 6, and 7. For simplicity, it is assumed that the generator voltage $E_g$ has the same effective value as the voltage $E_b$. Assuming only a part of the resistance 28 in circuit, as shown in Fig. 1, the characteristic of the relay C, shown in Fig. 4, is such that the resultant clockwise torque on the cylinder 17 of the relay C is sufficient to close the contacts 20 of this relay at a point L in advance of the inphase condition by a predetermined advance angle and maintain them closed through the angular range L–0°–90°–M whereupon a reversal in torque on the cylinder results in opening the contacts 20 and closing the contacts 21 at a point M and maintaining them closed through the angular range M–180°–270°–L. If the amount of resistance 28 in circuit is increased, then the solid line L—M will be shifted to some other position indicated by the dotted line L'—M', thus increasing the advance angle.

The heavy solid and dotted lines of Fig. 5 indicate the operational characteristic of the relay H on the basis of the voltage across the winding 29 of this relay and the phase angle between $E_b$ and $E_g$. The solid and dotted line circles P and D represent respectively the pickup and dropout voltages of the relay H. If the voltage across the winding 29 of the relay H increases from 0 at a phase displacement of 135° between $E_b$ and $E_g$ to the pickup value 0S at the phase displacement 225°, the relay H will operate to close its contacts if the contacts 21 of the relay C are closed. When the relay H picks up, the increased inductance of its winding circuit results in a greater voltage drop across the winding. In consequence of this, the characteristic is not a smooth curve but has an irregularity produced by the sudden increase in inductance with the resultant change in the voltage from the value 0S to the value 0T. From this point T through the range 270°–0°–90° the voltage across the relay H exceeds the dropout value. At the 90° phase displacement position, however, the dropout value 0U is reached and because of the sudden change in inductance due to the dropout of the relay, the voltage drops to the value 0V. Following this, the voltage returns to the 0 value at 135° phase displacement. The solid line cycle just traced is on the basis that the generator frequency is higher than the bus frequency. If the bus frequency is higher than the generator frequency, then the voltage across the relay H is represented by the partly solid and partly dotted line curve 0–V–W–X–0°–270°–T–Y–Z–0, disregarding, of course, the action of the relay C which opens the circuit of the relay H at contacts 21 from approximately 135° around to the angle corresponding to L of Fig. 6.

Referring now to Fig. 6 and assuming that the source G is of lower frequency than the source B, then at the point L, C operates to close its contacts 21. At this point, as will be obvious from the heavy solid line curve in Fig. 5, the voltage across H is sufficient to effect the energization of this relay, which will pick up to close its contacts and complete its holding circuit. Although the contacts 21 remain closed through the range L–270°–180°–M, the relay H will drop out at 180° since, at this point, the voltage 0Y on this relay is insufficient to maintain it closed. Consequently, before the relay C can return to close its contacts 20, the contacts of the relay H will be opened, and no closing of the contactor 10 can be effected. Assuming, however, that the frequency of the source G exceeds the frequency of the source B, then at M the relay C operates to close its contacts 21, which remain closed through the range M–180°–225°–270°–L. At some phase displacement, such as 225°, the voltage across the relay H rises to the pickup value 0S, and the relay H operates to close its contacts 38 and 42. At the point L, however, the torque on the cylinder 17 is reversed. This results in the opening of the contacts 21 and the closing of the contacts 20 of the relay C. Since the voltage on the relay H is great enough to maintain it in the picked-up position until the 90° position is reached, the circuit of the winding 11 is completed to cause the closing or connecting operation of the contactor 10 at some point K which is at or sufficiently close to the inphase position.

High speed induction relays of the type schematically illustrated as relay C in Fig. 1 tend to permit closure of the contactor 10 at too great a frequency difference, and the sluggishness of relays of the hinged-armature type such as are schematically illustrated in the relay H is insufficient to prevent this undesired operation. In such cases, a further frequency difference response refinement may be employed. This refinement is schematically illustrated in Fig. 1 by the auxiliary switch 30, which can be operated by any suitable frequency difference responsive means, examples of which are well known to the art. By putting a switch of such means in series relation with the contacts 21 of the relay C and the winding 29 of the relay H, the operation of this relay can be prevented if it is desired to reduce the frequency difference below the value at which the relay C will operate.

Instead of using a separate frequency difference responsive device to obtain greater refinement, I may incorporate this feature by suitable modification of the relay C, as shown in perspective in Fig. 9. This modification embodies an increase in sensitivity to frequency difference by virtue of a time factor, such as a time delay in the operation of the relay C if the frequency difference is too high. As shown in Fig. 9, the contacts 20' and 21' are engaged by a movable contact member 19' which, as shown, is provided with stationary cups 45 and biased by a spring 46 to engage contact 20'. A guiding member 45' is provided to maintain the member 19' in its bearings and yet allow the desired angular movement for switching operation. For moving contact 19' to engage contacts 20' and 21' for only a small frequency difference, I provide an inertia type time delayed mechanism comprising a contact operating member 47 which is movable with and by a rotating mass, such as a flywheel 48. As shown, the axis of this flywheel is colinear with the shaft 18. For this purpose, the flywheel may be mounted on a ball bearing 49 near the upper end of the shaft. The cylinder 17 can be rotated a predetermined amount in the direction shown by the arrow 50 substantially independently of the flywheel 48. The cylinder 17 is biased to turn oppositely to the direction shown by the arrow 50 by a spring 51. When the cup is turned oppositely to the direction shown by the arrow 50, an arm 52, rigidly mounted on the shaft 18 engages the operating member 47 to turn the flywheel 48 in the direction shown by the arrow 53 until the arm 47 comes to rest against a stop 54, as shown in the drawings. The stop 54 is adjustably positioned on the end bearing screw 55 of the shaft 18 just below a shaft bearing support 56. Thus, as shown, the stop 54 is mounted on a member 58, which is threaded on the bearing screw 55 below the support 56, and the parts are locked in place by a nut 59. When the torque on the cylinder 17 is such as to turn it in the direction shown by the arrow 50, the end of the arm 52 moves toward the left through a recess in the movable contact member 19' and engages a stop 60. During this movement of the shaft 18, a spring 61 secured to the shaft 18 and engaging the contact operating member 47 is stressed and tends to turn the flywheel 48 oppositely to the direction shown by the arrow 53. If the rate of change of phase relation between the electromotive forces $E_g$ and $E_b$ is sufficiently small, that is, if the frequency difference is below the desired amount, then the contact operating member 47 will engage a projection 62 on the contact controlling member 19' and tilt this member to the left against the bias of the spring 46 to effect disengagement of the contact 20' and engagement of 21'. Since the angular movement of the contact operating member 47 to effect disengagement of 20' and engagement of 21' is relatively large and can be adjusted at will, the frequency difference at which the connecting operation may be effected can readily be controlled. Also since the contact operating member 47 has to move but a relatively small amount in the direction shown by the arrow 53 when the torque on the cylinder 17 is reversed, the contact controlling member 19' is quickly released to disengage contact 21' and re-engage contact 20' so that the connecting operation can be completed with the shortest possible delay.

Instead of using capacitive reactance and resistance to obtain the different power factor circuits for energizing the relay H from the voltages $E_g$ and $E_b$, I may obtain these different power factor circuits by the use of inductive reactance and resistance, as shown in Fig. 3. Thus, instead of connecting the capacitive reactance $x_c$ and the resistance $r$ in series with the winding 29 across the source $E_g$, I may connect the resistance R and the winding 29 across this source. At the same time, there will be connected across the source $E_b$ in series with the winding 29 of the relay H the resistance $r$ and the inductive reactance $x_l$, as shown in Fig. 3, and the ohmic values of each of these will be chosen equal to $$\sqrt{\tfrac{2}{2}}R$$

For this arrangement of electrical quantities, vector diagrams analogous to Figs. 2a and 2b may be drawn to show that the results obtained are substantially the same as with the arrangement shown in Fig. 1.

The modification of my invention shown in Fig. 8 is intended for use without the necessity for potential transformers. In this modification, the coils 15 and 16 of the relay C are schematically shown as two windings 15' and 16', and the positions of the bus and generator are reversed relatively to Fig. 1. In this embodiment of my invention, the connections and operation differ essentially from the arrangement shown in Fig. 1 only in that a four-pole control switch 65 is used to connect the various devices to the voltages $E_b$ and $E_g$, and a resistance 66 is used to be certain that this switch does not itself function as a connecting means to tie the sources together without a synchronism check. The switch 32', which may be hand operated or otherwise, as in response to faults, can be used to open the contactor 10 the same as the switch 32 of Fig. 1. The operation of this embodiment of my invention will otherwise be obvious from the description of Fig. 1.

While I have shown and described my invention in considerable detail, I do not desire to be limited to the exact arrangements shown, but seek to cover in the appended claims all those modifications which fall within the true spirit and scope of my invention.

What I claim as new and desire to secure by Letters Patent of the United States is:

1. Means for obtaining an indication of the direction of the difference between the frequencies of two independent sources of alternating electromotive forces comprising two circuits of different power factor respectively connected to be energized by two electromotive forces respectively obtained from an electromotive force of each of said sources, an electromagnetic device, and means connected to be operated in dependence on the product of said two electromotive forces and a function of the phase angle between them for connecting said device in said circuits over a predetermined range of phase difference between said two electromotive forces.

2. Means for obtaining an indication of the direction of the difference between the frequencies of two independent sources of alternating electromotive forces comprising means for deriving from two electromotive forces respectively obtained from an electromotive force of each of said sources two currents having a predetermined phase displacement which exceeds the phase displacement of the two electromotive forces, an electromagnetic device and means connected to be operated in dependence on the phase relation between said two electromotive forces and arranged to effect the energization of said electromagnetic device proportionally to the vectorial sum of said derived currents over a predetermined range of phase difference between said two electromotive forces.

3. An arrangement for use in determining when two independent sources of alternating electromotive force may be safely interconnected comprising means for deriving from said sources two currents having a phase displacement differing from the phase displacement of two corresponding electromotive forces of the sources by a predetermined fixed amount, an electromagnetic device and means connected to be operated in dependence on the phase relation between said two corresponding electromotive forces and arranged to effect the energization of said device proportionally to the vectorial sum of said derived currents over a predetermined range of phase difference between said two corresponding electromotive forces.

4. An arrangement for use in determining when two independent sources of alternating electromotive force may be safely interconnected comprising means for deriving from two corresponding electromotive forces of said sources two currents having a phase displacement exceeding the phase displacement of said two corresponding electromotive forces by a predetermined fixed amount, an electromagnetic device and means connected to be operated in dependence on the phase relation between said two corresponding electromotive forces and arranged to effect the energization of said device proportionally to the vectorial sum of said derived currents over a predetermined range of phase difference between said two corresponding electromotive forces.

5. An arrangement for use in determining when two independent sources of alternating electromotive force may be safely interconnected comprising means for deriving from an electromotive force of one of said sources a current having a substantially constant predetermined phase displacement relatively to the electromotive force, means for deriving from the corresponding electromotive force of said second source a current substantially in phase with the electromotive force, an electromagnetic device and means connected to be operated in dependence on the phase relation between said corresponding electromotive forces and arranged to effect the energization of said device proportionally to the vectorial sum of said derived currents over a predetermined range of phase difference between said corresponding electromotive forces.

6. An arrangement for connecting two sources of polyphase electromotive forces comprising connecting means, a control circuit for effecting the connecting operation of said connecting means and cooperating means for controlling the energization of said control circuit comprising an electromagnetic device having energizing winding means and means for energizing said winding means in dependence on the phase relation of only two corresponding electromotive forces of said sources, including two circuits of different power factor respectively connected to be energized in dependence on said two corresponding electromotive forces and electromagnetic means connected and arranged to operate in dependence on the product of said electromotive forces and the sine of an angle less than the phase angle between the electromotive forces.

7. An arrangement for connecting two sources of polyphase electromotive forces comprising connecting means, a control circuit for effecting the connecting operation of said connecting means and cooperating means for controlling the energization of said control circuit comprising a first relay having a single energizing winding, means for energizing said winding in dependence on the phase relation of only two corresponding electromotive forces of said sources including two circuits of different power factor respectively arranged to be energized in dependence on said two corresponding electromotive forces, each of said different power factor circuits having said winding in common, and a second relay having actuating means connected and arranged to operate in dependence on the product of said electromotive forces and a function of the phase angle between them, said second relay comprising means for controlling said two different power factor circuits.

8. An arrangement for connecting two sources of alternating electromotive force only when the frequency of one source exceeds the frequency of the other source comprising connecting means, a control circuit for effecting the connecting operation of said connecting means and cooperating means for controlling the energization of said control circuit comprising an electromagnetic device having energizing winding means, means for energizing said winding means in dependence on the phase relation of two corresponding electromotive forces of said sources including two circuits of different power factor respectively connected to be energized in dependence on said two corresponding electromotive forces and electromagnetic means having actuating means connected and arranged to operate in dependence on the product of said corresponding electromotive forces and a function of the phase angle between them and means controlled by said electromagnetic means for effecting the energization of said winding means from said two circuits and in cooperation with said electromagnetic device the energization of said control circuit.

9. An arrangement for connecting two sources of alternating electromotive force only when the frequency of one source exceeds the frequency of the other source comprising connecting means, a control circuit for effecting the connecting operation of said connecting means, means for controlling the energization of said control circuit comprising a control relay having a single magnetic circuit and relatively movable cooperating contacts, means for energizing said magnetic circuit in dependence on the phase relation of two corresponding electromotive forces of said sources including two circuits of different power factor respectively connected to be energized from said two corresponding electromotive forces, an induction relay of the type whose operation is dependent on the product of two electric quantities and the phase angle between them having windings respectively connected to be energized in dependence on said two corresponding electromotive forces and contact means for controlling the energization of said control relay over a predetermined range of phase difference between said two corresponding electromotive forces and for cooperating with the contact means of said control relay over a different predetermined range of phase difference between said two corresponding electromotive forces when the contacts of said control relay are in a predetermined position.

10. An arrangement for connecting two sources of alternating electromotive force only when the frequency of one source exceeds the frequency of the other source comprising connecting means, a control circuit for effecting the connecting operation of said connecting means, means for controlling the energization of said control circuit comprising an electromagnetic device having energizing winding means and two switching means, one in series in said control circuit and another in series with said winding means, means for deriving from two corresponding electromotive forces of said sources two currents having a phase displacement exceeding the phase displacement of said two corresponding electromotive forces by a predetermined fixed amount, means for effecting the energization of said winding means and controlling said control circuit in cooperation with said device comprising electromagnetic means having a movable member, means for actuating said member from an initial position to another position at a predetermined phase difference between said two corresponding electromotive forces and maintaining the member in said other position over a predetermined range of phase difference of said two corresponding electromotive forces and then returning the member to the initial position for a different predetermined range of phase difference of said two corresponding electromotive forces, switching means in series with said winding means and in parallel with said other switching means of said device, controlled by said movable member to effect energization of said device in accordance with the vectorial sum of said derived currents when the member is in said other position and switching means controlled by said member to effect in cooperation with said one switching means of said device the completion of said control circuit when the movable member of said electromagnetic means is in the initial position and said device is energized to close the said one switching means thereof.

11. An arrangement for controlling the connection of two sources of alternating electromotive force when a predetermined phase and frequency relation exists between their electromotive forces comprising connecting means, a control circuit for effecting the connecting operation of said connecting means, means for controlling said control circuit comprising a first relay having energizing winding means and contacts controlled thereby in said control circuit, a second relay connected to be energized in dependence on said electromotive forces and comprising contacts in said control circuit and in the circuit of said winding means, a movable contact controlling member arranged in one position to close the contacts in the control circuit and in another position to close the contacts in the circuit of said winding means, means for biasing the contact controlling member to said other position and means for delaying the movement of said member from its biased position in dependence on the frequency difference of said electromotive forces constructed and arranged to permit a quick return of the member to the biased position in dependence on the phase relation of the electromotive forces.

12. An arrangement for controlling the connection of two sources of alternating electromotive force when a predetermined phase and frequency relation exists between their electromotive forces comprising connecting means, a control circuit for effecting the connecting operation of said connecting means, means for controlling said control circuit comprising a first relay having energizing winding means and contacts controlled thereby in said control circuit, means for energizing said winding means in dependence on the phase relation of said electromotive forces, a second relay connected to be energized in dependence on said electromotive forces and operative in accordance with the phase relation thereof, said second relay comprising contacts in said control circuit and contacts for connecting said winding means to said energizing means, a movable contact controlling member arranged in one position to close the contacts in the control circuit and in another position to close the contacts in the circuit of said winding means and said energizing means, means for biasing the contact controlling member to said other position, means for delaying the movement of said member from its biased position in dependence on the frequency difference of said electromotive forces constructed and arranged to permit a quick return of the member to the biased position at a predetermined phase relation between the electromotive forces.

13. An arrangement for determining when two independent sources of alternating electromotive force may be safely interconnected comprising means for deriving from said sources two currents having a phase displacement exceeding the phase displacement of the electromotive force of one of the sources with respect to the electromotive force of the other of the sources by a predetermined fixed amount, an electromagnetic device, and means connected to be operated in dependence on the phase relation between the electromotive forces of said sources and arranged to effect the energization of said device in accordance with the vectorial sum of said derived currents over a predetermined range of phase difference between the electromotive forces.

14. An arrangement for connecting two sources of alternating electromotive force only when the frequency of one source exceeds the frequency of the other source comprising connecting means, a control circuit for effecting the connecting operation of said connecting means, and means for controlling the energization of said control circuit comprising an electromagnetic device having energizing winding means, means for energizing said winding means in dependence on the phase relation of two corresponding electromotive forces of said sources including two circuits of different power factor respectively connected to be energized in dependence on said two corresponding electromotive forces and cooperating electromagnetic means connected to operate in dependence on the product of said corresponding electromotive forces and the function of the phase angle between them for effecting the energization of said winding means from said two circuits and the control of said control circuit.

15. In combination, two energized disconnected alternating current circuits, an electromagnetic device having a single operating winding, means for deriving from two electromotive forces respectively obtained from an electromotive force of each of said circuits two currents, the relative phase relation of which differs from that of said two electromotive forces, and means for simultaneously causing the resultant of said two derived currents to flow in said operating winding during a predetermined range of phase displacement of said two electromotive forces.

16. In combination, two energized disconnected alternating current circuits, an electromagnetic device having energizing winding means, means for deriving from two electromotive forces respectively obtained from an electromotive force of each of said circuits two currents, the relative phase relation of which differs from that of said two electromotive forces, and means dependent upon a function of the product of said two electromotive forces and a predetermined function of their phase displacement for simultaneously causing said two derived currents to energize said winding means.

17. In combination, two energized disconnected alternating current circuits, an electromagnetic device having energizing winding means, means for deriving from two electromotive forces respectively obtained from an electromotive force of each of said circuits two currents, the relative phase relation of which differs from that of said two electromotive forces, means dependent upon a function of the product of said two electromotive forces and a predetermined function of their phase displacement for simultaneously causing said two derived currents to energize said winding means, and means dependent upon a predetermined change in the energization of said product responsive means while said two derived currents are flowing in said winding means for effecting the connection of said circuits.

18. In combination, two energized disconnected alternating current circuits, an electromagnetic device having energizing winding means, means for deriving from two corresponding electromotive forces of said circuits two currents, the relative phase relation of which differs from that of said two corresponding electromotive forces, control means comprising a movable member and means for exerting upon said member an effect dependent upon a function of the product of said two corresponding electromotive forces of said circuit and a predetermined function of their phase displacement for simultaneously causing said two derived currents to energize said winding means, and means dependent upon a reversal in the effect upon said movable member while the resultant energization of said winding means by said derived currents exceeds a predetermined value for effecting the connection of said circuits.

HAROLD T. SEELEY.

Certificate of Correction

Patent No. 2,311,474.   February 16, 1943.

HAROLD T. SEELEY

It is hereby certified that error appears in the printed specification of the above numbered patent requiring correction as follows: Page 5, first column, lines 23–25, for "$\sqrt{\frac{2}{2}}R$"   read   $\frac{\sqrt{2}}{2}R$ and that the said Letters Patent should be read with this correction therein that the same may conform to the record of the case in the Patent Office.

Signed and sealed this 6th day of April, A. D. 1943.

[SEAL]

HENRY VAN ARSDALE,
*Acting Commissioner of Patents.*